United States Patent

[11] 3,617,216

[72] Inventors Kenneth Arkless
Durham;
Denis Cleaver, Saltburn; Alan Lawrence Hare, Durham, all of England
[21] Appl. No. 419,597
[22] Filed Dec. 18, 1964
[45] Patented Nov. 2, 1971
[73] Assignee British Titan Products Company Limited
Durham, England
[32] Priority Dec. 24, 1963
[33] Great Britain
[31] 50,954/63

[54] IMPROVED OXIDATION PROCESS FOR THE PRODUCTION OF PIGMENTARY WHITE METAL OXIDES
18 Claims, No Drawings
[52] U.S. Cl. .................................................. 23/202,
23/1, 23/139, 23/140, 23/142, 23/182, 106/300,
204/164
[51] Int. Cl. ...................................................... C01g 1/02,
C01g 23/04, C09c 1/36
[50] Field of Search ............................................ 23/202, 1,
142, 139, 140, 182, 183, 145, 200, 153; 106/300;
204/164

[56] References Cited
UNITED STATES PATENTS

| | | | |
|---|---|---|---|
| 2,731,410 | 1/1956 | Weir............................. | 204/164 |
| 2,768,061 | 10/1956 | Cook et al. ................... | 23/153 |
| 2,979,449 | 4/1961 | Sheer et al. ................... | 204/164 |
| 3,099,614 | 7/1963 | Sheer et al. ................... | 204/164 |
| 3,114,691 | 12/1963 | Case............................. | 23/202 UX |
| 3,275,411 | 9/1963 | Freeman et al. ............... | 23/202 |

*Primary Examiner*—Edward Stern
*Attorney*—Birch, Swindler, McKie & Beckett

ABSTRACT: There are various methods for the production of white metal oxides such as titanium dioxide in which one or more gas or vapor are heated by passage through an electric arc or electric discharge device. The electrodes have been found to introduce significant impurities into the final product. It has now been found, however, that the discoloring impurities can be very substantially reduced by having at least one of the electrodes and preferably all of the electrodes constructed from a metal such as aluminum, titanium, zirconium, or the alloys thereof or from the electrically conducting nitrides or carbides thereof. Since the impurity results from the oxidation of the electrode, it is essential that the oxides be essentially white or colorless.

IMPROVED OXIDATION PROCESS FOR THE PRODUCTION OF PIGMENTARY WHITE METAL OXIDES

The present invention relates to an improved process and apparatus for the production of finely divided white metal oxide by the oxidation, in the vapor phase, of a metal halide.

In British application No. 4609/62, published as British Pat. specification 1,035,191, there is described and claimed a process for the production of metal oxides, including pigmentary titanium dioxide, by the oxidation in the vapor phase of the corresponding halide in a reaction zone into which there is introduced a gas which has been heated by passage through an electric arc or by inducting heating. The gas so heated may be all, or part, of one of the reactants or it may be a gas which is substantially inert to the reaction, such as argon or nitrogen.

One device for heating the gas which is described in the aforesaid British Pat. specification is that generally known as a "plasma gun," comprising a central cathode connected to a source of electrical energy and a cylindrical anode also connected to a source of electrical energy. The anode and/or cathode may be cooled by contact with cooling fluid.

In British application No. 3528/62 now British Pat. No. 991,318, there is described and claimed a process for the production of finely divided metal oxides, including pigmentary titanium dioxide, wherein a stream of hot gas containing initial solid particles of smaller average particle size than that of the metal oxide to be produced is introduced into a reaction zone; a metal halide, for example titanium tetrachloride, an an oxygenating gas, for example oxygen or an oxygen-containing gas mixture, are introduced into the reaction zone, at least one of these reactants being introduced through a plurality of inlets spaced along the length of the zone in the direction of the gas flow; and the temperature in the reaction zone is such that the halide and the oxygenating gas will react to form metal oxide. Such a process is of particular value in the production of high quality pigmentary titanium dioxide.

One method which may be used to produce the hot gas stream containing the initial solid particles is passing an inert gas through, or in contact with, an electric arc or discharge, as previously described, and introducing a metal halide and oxygenating gas into the hot gas stream to produce particles of metal oxide. If desired, however, all or part of one of the reactants may be heated by contact with the electric arc or discharge to form the hot gas stream and the particles may be formed by the introduction into this stream of the other reactant.

Alternatively, the initial solid particles may be formed by the vaporization and recondensation of a solid material such as a metal oxide fed into the hot gas stream.

It is, of course, also possible to produce finely divided metal oxides by introducing into the reaction zone a hot gas stream heated by passage through, or contact with, an electric arc or discharge, which does not contain solid particles and thereafter making one or more introductions of a metal halide and/or an oxygenating gas into the reaction zone, (although after the first introduction of both reactants initial solid particles may be formed and the remainder of the process then may be equated with that of the aforesaid British Pat. No. 991,381. Again the hot gas stream may comprise all or part of one of the reactants or it may be a gas substantially inert to the reaction such as argon or nitrogen.

When one uses the method of the aforesaid British specification 1,035,191, or that of British Pat. No. 991,318 incorporating use of an electric arc or discharge as described above, one frequently finds that the oxide product is discolored. We have found that this discoloration maybe due to impurities originating in the material of construction of the anode or cathode of the electric arc or discharge device and transferred to the oxide product during its formation or presence in the reaction zone.

In the production of white metal oxides, for example pigmentary titanium dioxide, it is generally of the greatest importance that the product should be as white as possible and one source of color which has a marked detrimental effect upon the pigment is a metal which forms colored compounds, particularly colored oxides. Examples of such metals are iron, copper, tungsten, chromium, nickel, cobalt and vanadium.

It is an object of the present invention to provide a method for the production of white metal oxides by the oxidation of a metal halide, for example by the processes described in British Pat. specification 1,035,191 or the above embodiment of British Pat. No. 991,318, wherein the presence of color-forming impurities originating in the cathode is prevented or reduced.

It is also an object of the invention to provide an apparatus for the production of white metal oxides, for example by said processes, wherein the presence of color-forming impurities originating in the anode or cathode is prevented or reduced.

Accordingly, the present invention is a process for the production of finely divided white metal oxide by the vapor phase oxidation of a metal halide with an oxygenating gas in a reaction zone into which is introduced a gas which has been heated by contact with an electric arc or discharge formed between a cathode and anode, at least one of the cathode and anode (and preferably both) being formed from metal or electrically conducting nonmetal, such metal or nonmetal giving rise only to substantially noncoloring products in the reaction zone.

The term "metal" as used in the specification includes silicon.

The preferred halides which are to be oxidized are chlorides. Fluorides are unsuitable for use in the present invention and the term "halide(s)" as used in the specification does not include fluoride(s).

A particularly useful application of the invention is in the vapor phase oxidation of titanium halides, preferably titanium tetrachloride, to titanium dioxide, particularly pigmentary titanium dioxide.

The invention is also of value in the production of silica, zirconia or alumina by the oxidation of the appropriate halide of the metal; important examples are the oxidation of silicon tetrachloride or zirconium tetrachloride to produce silica or zirconia, respectively, and the oxidation of aluminum trichloride to produce alumina.

The oxygenating gas is preferably oxygen or an oxygen-containing gas mixture such as air although other gases may be used which oxidize the metal halide to the corresponding oxide under the conditions existing in the reaction zone provided, of course, that they have no adverse effect upon the reaction and/or the product.

The gas heated by contact with the electric arc or discharge may be an inert gas. Alternatively, it may be the oxygenating gas or, if desired, it may be the metal halide.

The temperatures in the reaction zone are desirably maintained at a sufficiently high level to ensure that the metal halide is rapidly oxidized to the corresponding oxide. Thus, in the case of titanium halides, mean reaction temperatures in the range 700° C. to 1,600° C. are preferred, particularly mean reaction temperatures in the range 900° C. to 1,300° C.

The reaction zone should be provided with an exit port or ports through which the gaseous suspension of oxide particles can be withdrawn for recovery and an injection port or ports for the introduction of the gas heated by contact with the electric arc or discharge, the metal halide and/or the oxygenating gas and, if desired, other additions. In the case of titanium halides, examples of such other additions are water, aluminum trihalide, zirconium tetrahalide, silicon tetrahalide and/or solid particles which may act as nuclei for growth of titanium dioxide (such as the inert solid particles of British Pat. No. 991,318), or titanium trichloride.

In the case of some metal halides, particularly titanium halides, there may be a tendency for some of the metal oxide formed to accumulate on the walls in the vicinity of the reaction zone. It is, therefore preferred, in the case of such metal titanium halides, to provide a scraping device within the reaction zone which operates in such a way that excessive accumulations of metal oxide on the walls of the reaction zone are prevented. If desired, this scraping device may also incorporate means to inject the metal halide and/or the oxygenating gas into the reaction zone. Such a device for titanium halides is described in British application No. 49126/63 now British Pat. specification 1,097,762 published Jan. 3, 1968.

The gas which is to be heated before introduction into the reaction zone may be heated in any device in which it is possible to maintain a stable electric arc or discharge over a sufficiently prolonged period. For example, it may be heated in the "plasma gun" device described in British Pat. specification 1,035,191 in which the discharge is maintained between a central cooled cathode and a surrounding cooled anode. Provision is made for the introduction of the gas around the cathode and its withdrawal through the center of the anode after passing through the arc formed between cathode and anode.

Alternatively, the device may comprise coaxial tubes of electrically conducting material placed end to end and separated by a coaxial tube of electrically insulating material. One tube forms the cathode and the other the anode and each is preferably fluid cooled.

In previously used apparatus for heating gases to a high temperature by contact with an electric arc or discharge, the electrodes are made of material selected for their good electrical and thermal properties. Pure copper is a very suitable material for many purposes but it is less suitable for use as an electrode when heating a gas for introducing into a reaction zone in which a metal halide is being oxidized to produce pigmentary titanium dioxide or other white metal oxide. It has been found that erosion of the copper may take place and the copper removed from the electrode contaminates the oxide product and forms a coloring impurity with a resulting deterioration of the quality, particularly a deterioration in the brightness of the pigment in the case of the production of pigmentary titanium dioxide.

Other materials which may cause similar deterioration in white oxide quality when used as or in an electrode are iron, cobalt, chromium, vanadium, nickel and tungsten.

It is preferred to use a material for both the cathode and anode which does not give rise to color-forming impurities in the product. In some methods of operating the gas-heating device, for example at a high voltage, the cathode may be the electrode which suffers greater erosion.

It is believed that the material eroded from the anode and/or cathode forms the oxide of the material under the conditions in the reaction zone and it is generally preferred, therefore, to form the anode and/or cathode of a material which gives rise to a noncoloring oxide.

Examples of materials which give rise to noncoloring impurities in a white oxide product and which may be used in the present process are many metals, for example, aluminum, titanium, zirconium and alloys thereof, and the corresponding electrically conducting nonmetals which may be compounds of such metals, for example the carbides or nitrides (which form white oxides).

Owing to the high temperatures reached in the gas-heating device it is desirable to provide an adequate supply of a cooling fluid, for example, water, in heat exchange contact with the anode and cathode during operation.

The following examples show various embodiments of the present invention.

EXAMPLE I.

A "plasma gun" of the type described was set up consisting of a central cathode of thoriated tungsten and an annular anode of titanium surrounding the front part of the cathode. The anode and cathode were provided with interior channels through which water was to circulate in heat exchange contact therewith.

Provision was made for the gas to be heated to be introduced behind the anode in such a manner that the gas followed a helical path in passing between the cathode and anode and out through the central space in the anode to the reactor.

An annular slot was formed on the external face of the anode surrounding the exit of the heated gases. The slot was formed between two discs of refractory material spaced apart and fixed to the face of the anode and provision was made for the supply of premixed titanium tetrachloride, oxygen, aluminum chloride and silicon tetrachloride to the annular slot.

The device was downwardly mounted upon a vertical silica tube 3 feet in length. From the lower end of the tube a collection system for recovering the pigmentary titanium dioxide was fitted. To operate the process the flow of coolant was commenced, argon was admitted into the device at a rate of 25 liters/minute and an arc was struck between the cathode and anode. The requirements of the arc were 20 volts at 350 amps.

A prefixed feed of titanium tetrachloride (1 gm. mole/min.) oxygen (1.5 gm. mole/min.) and sufficient aluminum trichloride to give 2 percent by weight of alumina (on $TiO_2$ produced) and sufficient silicon tetrachloride to give 0.25 percent silica (on $TiO_2$ produced) was supplied to the annular slot.

Pigmentary titanium dioxide was formed in the silica tube and was recovered from the collection system and was analyzed for content of the material from which the anode and cathode were made, and the brightness of the product was estimated. The results of these estimations are given in the table.

The brightness of the pigmentary titanium dioxide was estimated visually against pure magnesium oxide by means of an arbitrary scale in which the magnesium oxide was given a value of 1 and higher values represent increasingly inferior brightness.

EXAMPLE II.

The process of example I was repeated using nitrogen as the heated gas. The requirements of the arc in this case were 40 volts and 200 amps.

EXAMPLE III.

The process of example 1 was repeated using an anode of zirconium metal.

EXAMPLE IV.

The process of example I was repeated using a titanium anode and thoriated tungsten cathode but argon was introduced around the cathode (as described in example V) at a rate of 5 liters/minute and oxygen was introduced in the manner of the argon introduction described in example I at a rate of 25 liters/minute. The amount of oxygen introduced through the annular slot on the face of the anode was correspondingly reduced.

The arc requirements were 38 volts and 250 amps.

EXAMPLE V.

The process of example I was repeated using an aluminum anode and thoriated tungsten cathode.

Argon was introduced into the device at a rate of 50 liters/minute and the arc requirements were 25 volts and 250 amps.

EXAMPLE VI.

An arc heating device of different design was used. This consisted of two jacketed aluminum tubes of one-half inch internal diameter and 1½ inch long. These were placed coaxially, the adjacent ends being separated by a tubular insulating body 2 inches in length. Provision was made for the introduction of part of the gas to be heated into one end of the device and the remainder was introduced tangentially through the wall of the insulated body. The first aluminum tube (into the end of which part of the gas was introduced) was the cathode and the tube on the opposite side of the insulating body (and from which the heated gas issued) was the anode.

The remainder of the apparatus was as described in example I.

Water was circulated through the jackets surrounding the anode and cathode and 10 liters/minute of oxygen were introduced into the open end of the anode and 40 liters/minute were introduced through the wall of the insulating body.

The arc requirements were 300 volts and 80 amps under these conditions.

Titanium tetrachloride 3 gm mole/minute premixed with 60 liters/minute oxygen and sufficient aluminum chloride and silicon tetrachloride to give 2 percent alumina and 0.25 percent silica (by weight on $TiO_2$) were fed to the annular slot on the face of the device.

EXAMPLE VII.

The processes of examples I and II were repeated in a manner not in accordance with the present invention using copper anodes. Analysis and brightness of the pigmentary titanium dioxide produced are given in the table.

The arc requirements given in the examples are from a source of direct current but a source of alternating current may be used but is generally not preferred.

The flow rates in the examples given as liters/minute are measured at room temperature and pressure.

| Example | Anode material | Cathode material | Gas heated | Impurities from anode (p.p.m. on $TiO_2$) | Impurities from cathode [1] | Brightness of pigmentary $TiO_2$ |
|---|---|---|---|---|---|---|
| I | Titanium | Thoriated tungsten | Argon | 1-2 | | 2½ |
| II | do | do | Nitrogen | 2-3 | | 2½ |
| III | Zirconium | do | Argon | <20 (zirconium) | 1-2 | 2½ |
| IV | Titanium | do | Argon plus oxygen | 2-3 | | 2½ |
| V | Aluminum | do | Argon | 2-3 | | 2½ |
| VI | do | Aluminum | Oxygen | | | 2 |
| VII | Copper | Thoriated tungsten | Argon | 50 (copper) | 1-2 | 8 |
| VIII | do | do | Nitrogen | 100 (copper) | 2-3 | 12 |

[1] Parts per million of $WO_3$ on $TiO_2$.

What is claimed is:

1. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone at least one of said electrodes constructed of a material selected from the group consisting of metals which form substantially noncoloring products on reaction with the contents of said reaction zone, and the alloys and electrically conducting carbides and nitrides thereof.

2. The process of claim 1 wherein the metal halide is titanium tetrachloride and said titanium tetrachloride is oxidized by an oxygen-containing gas.

3. The process of claim 2 wherein the reaction zone is maintained at a temperature of 700° to 1,600° C.

4. The process of claim 1 wherein the gas heated by passage through the plasma arc is an inert gas.

5. The process of claim 1 wherein the gas heated by passage through the plasma arc is an oxygenating gas.

6. The process of claim 1 wherein the gas heated by passage through the plasma arc is a metal halide.

7. The process of claim 1 in which the electric arc is radially in line with the reaction zone.

8. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of aluminum carbide.

9. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of titanium carbide.

10. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of zirconium carbide.

11. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of aluminum nitride.

12. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of titanium nitride.

13. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of zirconium nitride.

14. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of aluminum.

15. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of titanium.

16. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, at least one of said electrodes constructed of zirconium.

17. In a process for the production of finely divided pigmentary white metal oxide by the oxidation of at least one metal halide in the vapor phase in a reaction zone maintained at an elevated temperature, the improvement which comprises heating a gas by passage through the plasma arc discharge of at least two electrodes and then feeding the gas to the reaction zone, each of said electrodes constructed out of at least one metal selected from the group consisting of aluminum, titanium, zirconium and the alloys thereof.

18. In a process of preparing finely divided white pigmentary metal oxide by vapor phase oxidation of a metal halide with at least a stoichiometric amount of an oxygen-containing gas in a reaction zone at elevated temperatures, the improvement which comprises generating a gaseous plasma by passing a gaseous stream through a discharge of electrical energy, said discharge being conducted between electrodes at least one of which contains a white oxide forming metallic element, generating from such electrode under the conditions of said electrical discharge particles comprising said metallic element, and forwarding said gaseous stream to said reaction zone whereby to carry particles comprising said metallic element into said reaction zone and into contact with said metal halide and oxygen-containing gas.

* * * * *